May 4, 1926.
C. F. CHAPMAN
1,583,657
COMBINATION TEA WAGON AND DISHWASHING MACHINE
Filed Nov. 10, 1921 4 Sheets-Sheet 1
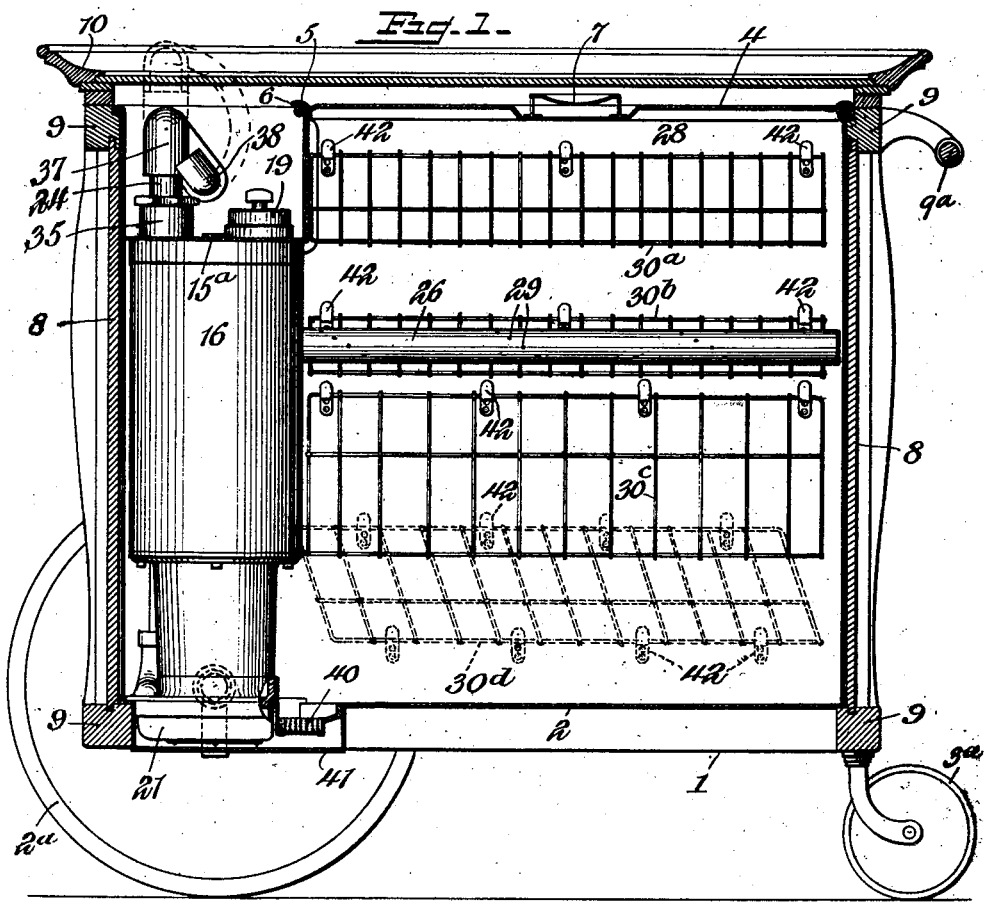
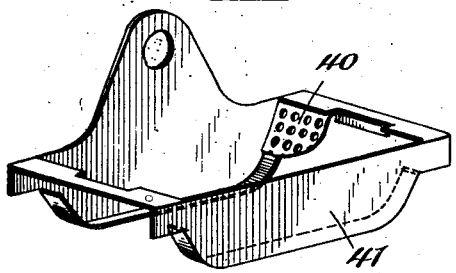
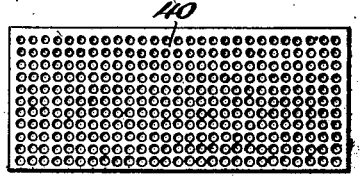
Charles F. Chapman
INVENTOR
WITNESSES
BY
ATTORNEY May 4, 1926.
C. F. CHAPMAN
1,583,657
COMBINATION TEA WAGON AND DISHWASHING MACHINE
Filed Nov. 10, 1921    4 Sheets-Sheet 2
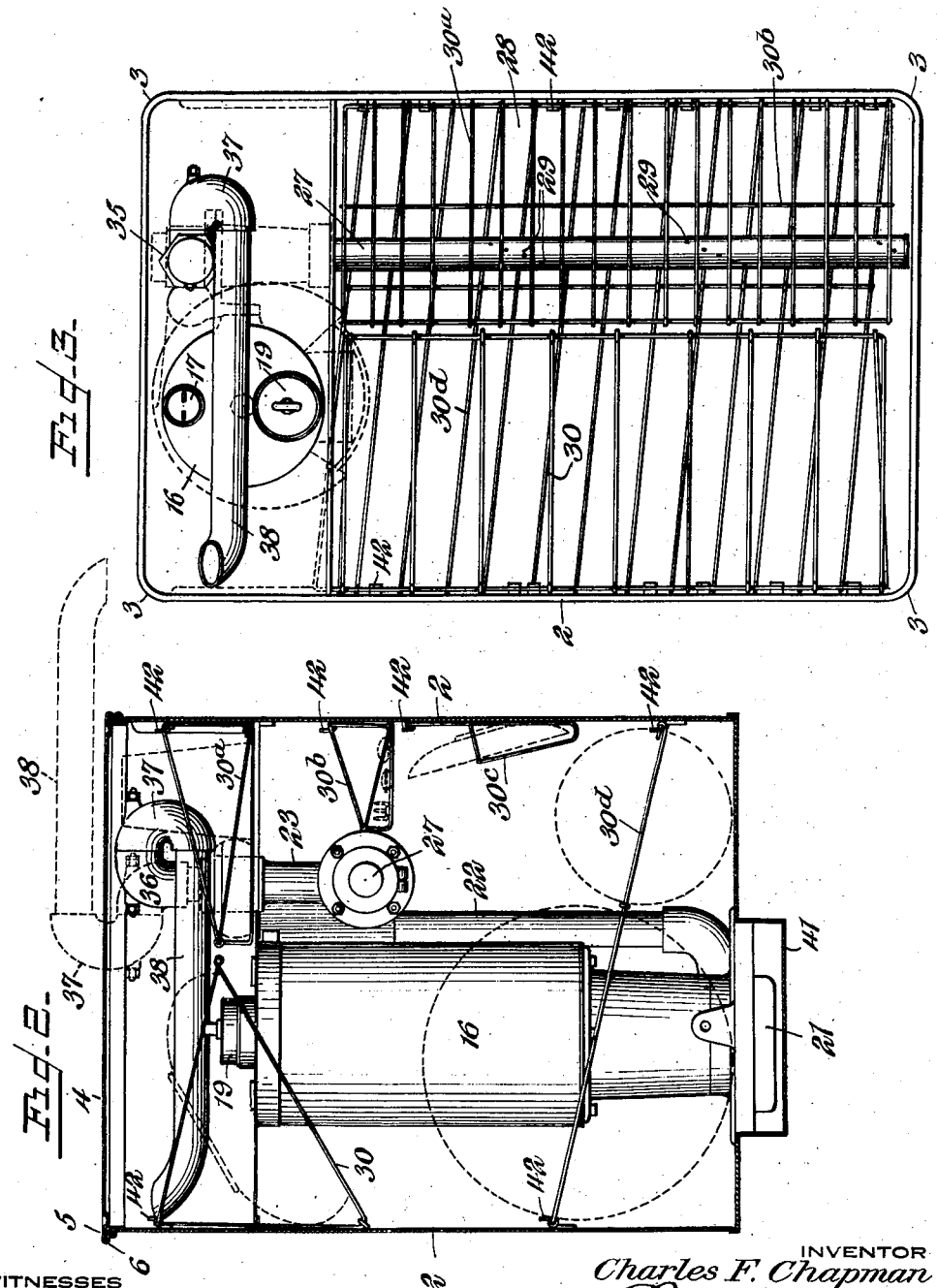
WITNESSES
Charles H. Durand
F. F. Chapman
INVENTOR
Charles F. Chapman
BY
ATTORNEY May 4, 1926.
C. F. CHAPMAN
1,583,657
COMBINATION TEA WAGON AND DISHWASHING MACHINE
Filed Nov. 10, 1921    4 Sheets-Sheet 3
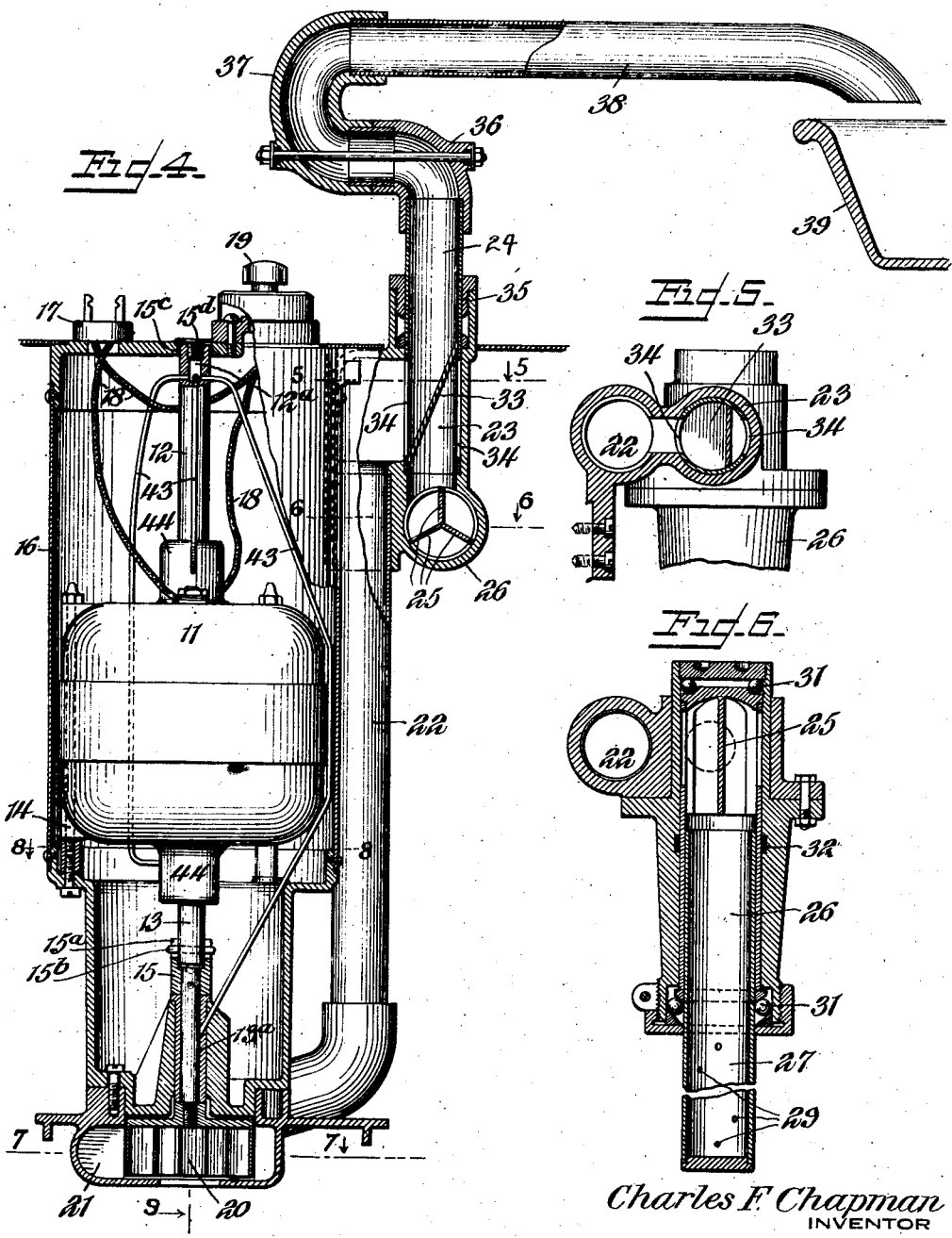
Charles F. Chapman
INVENTOR
WITNESSES
BY
ATTORNEY

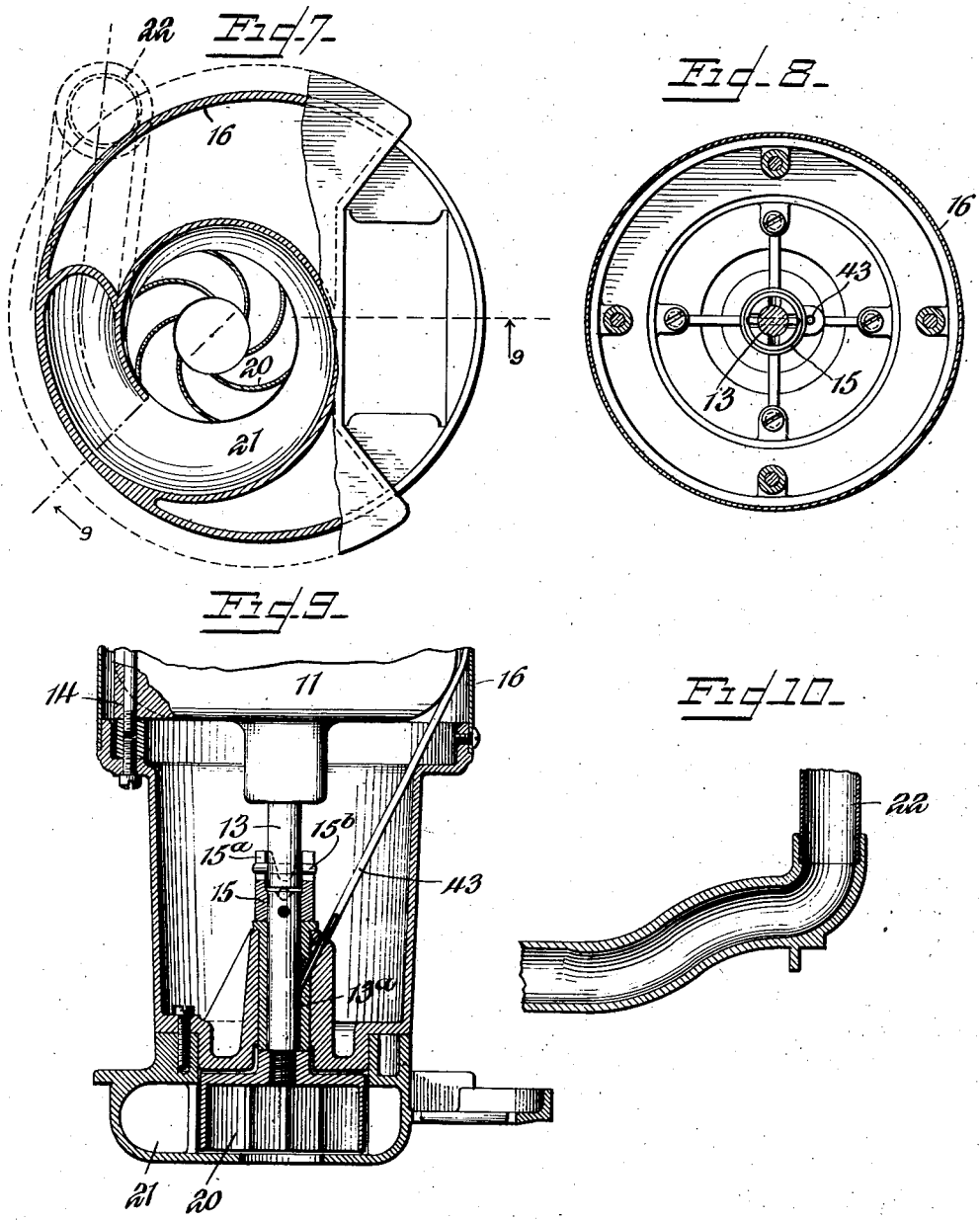

Patented May 4, 1926.

1,583,657

UNITED STATES PATENT OFFICE.

CHARLES F. CHAPMAN, OF ROCHESTER, NEW YORK.

COMBINATION TEA WAGON AND DISHWASHING MACHINE.

Application filed November 10, 1921. Serial No. 514,357.

*To all whom it may concern:*

Be it known that I, CHARLES F. CHAPMAN, a citizen of the United States, residing at Rochester, in the county of Monroe and State of New York, have invented new and useful Combination Tea Wagon and Dishwashing Machines, of which the following is a specification.

This invention has reference to a combination tea wagon and dishwashing machine, and its object is to provide in a single machine, means whereby meals may be served as from a tea wagon, and the soiled dishes may be removed to a suitable point, say a kitchen, where the dishes may be washed and, if desired, be allowed to remain in the dishwasher until again needed, for the washing is of such a character as to thoroughly cleanse the dishes so they will dry spontaneously, and require no wiping.

In accordance with the invention, there is provided a structure, similar in outward appearance to an ordinary tea wagon, except that the body thereof is made of sufficient size, and is so constructed as to contain the dishes to be cleansed, and also to hold an ample supply of hot water for cleansing purposes. The hot water is circulated by means of a suitable pump, which pump may be electrically driven, in order to forcibly circulate the water in numerous fine streams over and about the dishes within the dishwasher, thus loosening and expelling any adherent matter therefrom. The water, carrying the particles of food, or other material, washed from the dishes reaches a low point where it passes over and through a paper or similar sheet constituting a sieve, and holding back the dislodged food, or the like, thus permitting the retaining sheet, with the particles of washed-off material, to be bodily removed from the machine and thrown away, for the retaining sheet may be made of such cheap material as to permit the discarding of it without adding more than a negligible amount to the expense of operating the machine.

Within the body of the dishwasher there are located dish-carrying racks of suitable shape to sustain the various dishes employed upon the dining or other table, and, as it may be desired, to bodily remove these racks with the dishes in them, and also, for the purpose of facilitating the cleansing of the machine, such racks are made readily detachable.

Inside of the body of the machine there is located, near one end thereof, an electric motor connected up to a pump in the dishwasher, for causing circulation of water within the machine, and for discharging the wash water from the machine into a suitable sink, or the like, whereby the interior of the machine may be emptied of the wash water without necessitating any permanent connection to the sink, or to a drain.

Because of the fact that the interior of the machine is subjected to the action of water, provision is made for preventing any of the water from reaching any of the electric devices, employed in driving the machine, and provision is also made for subjecting the working bearings of the machine to the protecting effect of lubricants.

The invention will be best understood from a consideration of the following detailed description, taken in connection with the accompanying drawings forming part of this specification, with the understanding, however, that the invention is not confined to any strict conformity with the showing of the drawings, but may be changed and modified, so long as such changes and modifications mark no material departure from the salient features of the invention as expressed in the appended claims.

In the drawings:—

Fig. 1 is a longitudinal section, with some parts in elevation, showing a combined tea wagon and dishwasher constructed in accordance with the invention;

Fig. 2 is a vertical section of the body of the structure with some parts, shown in both full and dotted lines, in different positions;

Fig. 3 is a plan view of the structure omitting the supporting wheels;

Fig. 4 is a vertical cross section of the structure, showing an overhanging discharge pipe in operative relation to a sink, for the purpose of emptying the dishwasher from contained water;

Fig. 5 is a section on the line 5—5 of Fig. 4;

Fig. 6 is a section on the line 6—6 of Fig. 4;

Fig. 7 is a section on the line 7—7 of Fig. 4;

Fig. 8 is a section on the line 8—8 of Fig. 4;

Fig. 9 is a section on the line 9—9 of Fig. 7;

Fig. 10 is a section of a detail of construction entering into the invention;

Fig. 11 is a detail view of a drain structure employed in the invention;

Fig. 12 is plain view of a sheet of screening material employed in connection with the construction shown in Fig. 11.

Referring to the drawings, there is shown a box-like body 1, of generally rectangular contour and including a sheet metal or similar tank 2, with rounded corners 3, (see Fig. 3). The body 1 is mounted on main wheels $2^a$ and caster wheels $3^a$, as usual.

The tank 2 is provided with a cover 4, having beaded margins 5, and overhang edges 6, by means of which the cover 4 is sustained on the tank. The cover 4 is provided with an intermediately located handle 7, whereby the cover 4 may be lifted off, when desired, to expose the interior of the tank 2.

The side and end walls of the body are in the form of panels 8, chiefly for ornamentation, and also serving to protect the metal tank. The body is exteriorly finished at the top and bottom by molding strips 9. A handle $9^a$ is provided at one end of the body to be grasped by the operator. Covering the entire top of the body and wholly concealing the mechanism therein, is a removable table top 10, which is shaped to simulate the top of an ordinary tea wagon. It is provided with an upstanding molding forming a flange entirely around the same, and the flange is sufficiently deep to keep any dishes placed on the table top from falling off. This table top is utilized to contain dishes during transportation from the kitchen to the dining room in which the meal is to be served. The top rests loosely but firmly on the molding strips, and its removal allows immediate access to the interior of the body.

The construction specified is advantageous from a manufacturing standpoint, as the tea wagon body may be built in the wood working department and the tank 2 in the sheet metal department, and the assembling of the elements is a simple matter.

Within one end of the dishwasher, there is located an upright electric motor 11, provided at opposite ends with shafts 12 and 13, respectively, one of which, the shaft 13, is the armature shaft of the motor 11. The armature shaft 13 extends downwardly into a coupling 15, having a transverse slot $15^a$ formed therein to receive a pin $15^b$, extending through the coupling to drive a lower shaft $13^a$. The motor is mounted on lugs 14, and the shaft 12 is fixed to a support or bearing $15^c$, provided with an upright, central counterbore $12^a$, entering the upper end of the shaft 12 and closed by a screw or other plug $15^d$. The motor is enclosed in a casing 16.

In order to supply the motor with electric current, there is an attachment plug 17, fed by conductors 18, and designed to be inserted in a suitable wall or other socket, not shown.

There is also made fast to the top of the casing 16, a snap switch 19, suitably coupled up to the electric side of the motor, for controlling the latter after the attachment plug is connected to the appropriate source of current.

The shaft 13 is extended downwardly and continued through an appropriate extension $13^a$, and is connected at its lower end to and supports a pump or impeller 20, located in a well or depression 21, below the bottom of the casing 16. Upon starting the electric motor, the pump will act to lift water gravitating into the well, and cause it to rise by way of a pipe 22 into a distributing chamber 23, near the top of the dishwasher, from which the water may be directed to a rotatable pipe 24, constituting a valve, and from thence into another pipe containing partitions or vanes 25. The pipe with the partitions or vanes 25, opens at a lower level into a horizontal pipe 26, to find its way through a horizontal continuation 27 thereof, along the length of the water compartment 28, occupying the main part of the dishwasher. As Figure 4 shows, the chamber 23 unites with the pipe 26 off center, hence the force of the water flowing from chamber 23 and acting against the partitions or vanes 25 in the pipe causes the rotation of the pipe 26 with its continuation 27, which are provided with numerous perforations 29 arranged helically. The disposition of these perforations improve the washing effect on the dishes, which are supported in racks within the dishwasher, causing streams of water to be thrown upon the dishes as the pipe rotates.

In the structure illustrated in the drawings, there is shown an arrangement of racks for dishes. The cover 4 is first removed, exposing the interior of the dish washer. This renders a rack 30 at the upper portion of the dishwashing compartment accessible for miscellaneous dishes. Alongside of the rack 30, is another rack $30^a$, for receiving cups and glasses or the like. Another rack $30^b$ is located below the rack 30ᵃ, for containing knives and forks. Saucers find a place in another rack 30ᶜ, while still another rack 30ᵈ extending across the bottom of the dishwashing compartment provides a holder for large and small dishes. All these racks are shown in Figs. 1, 2 and 3, and the arrangement is quite useful, without, however, limiting the structure to such particular arrangement.

The racks are usually constructed of galvanized wire or rods, or of some other suitable material and shaped to sustain dishes in various positions and of various sizes so that the streams of water issuing through the perforation 29 and distributed by the rotation of the pipe continuation 27, may be impelled against the dishes in such manner as to forcibly engage the latter and dislodge any particles of food or the like which may adhere thereto. The pipe 26 is mounted upon ball bearings 31 at opposite ends (see Fig. 6) and suitable packing 32 is inserted wherever needed.

The pipe 24 is provided with an intermediately located inclined partition 33, extending lengthwise thereof between openings 34, whereby to constitute a valve, so that water flowing through the pipe 22 may find its way either into the pipe 26, or into the pipe 24, the latter being connected through a gland 35, into one end of a swivel coupling 36, connected by a return coupling 37, to another pipe 38, which I term a drain spout, of a length to reach over a sink 39, so that water passing through the pipe 38, may be directed into the sink 39, instead of into the horizontal pipe 26. The arrangement is such that when soiled dishes are deposited in the dishwasher upon the racks provided for the purpose, and the current is turned on, after the attachment plug 17 is coupled up in the circuit, and hot wash water has been introduced into the dishwasher, the pump 20 is actuated to cause the water reaching the pump to flow upwardly along the pipe 22, and thence, with the valve partition 33 properly adjusted by the turning of the drain spout, through the horizontal pipe 26, and its continuation 27, to issue through the jets 29, in numerous streams against the soiled dishes in the racks of the dishwasher.

After the washing operation has been continued for an appropriate period of time, and hot water has been circulated through the dishwashing compartment, the dishes become thoroughly cleansed, and the wash water, contaminated with dislodged particles of food, is directed through the sieve or filter sheet 40, located in the pan 41, until the dislodged particles have been collected on the sieve sheet carried by the pan which is removably located in the well 21, close to the lower end of the motor casing 16. The sieve 40 may be made of perforated or porous paper, with the perforations sufficiently fine to retain the dislodged food and the paper be of a sufficiently cheap character to permit throwing it away to save washing. The pan 41 is located in the well 21, so that all the water flowing through the dishwasher will pass into and through the pan 41 and through the paper sieve 40, to be caught up again by the pump and again circulated. The water introduced into the dishwater compartment may be circulated numerous times through the dishwater, for all the water so circulated must ultimately pass through the sheet 40 to be deprived of its solid particles before being re-pumped through the body of the dishwasher.

When the circulation of the wash water has been continued long enough, the pipe 38 is then so adjusted that its discharge end overhangs the sink 39, and by continuing the operation of the motor 11, the contaminated water is ultimately discharged from the dishwasher. Finally, by taking off the cover 4, the sieve 40 with the collected food particles may be removed and thrown into the garbage pail or other place of disposal. Following this, all the original wash water may be discharged and then the pipe 38 turned about the swivel 36, so that its discharge end is below the level of the pipe, when hot rinsing water may be introduced into the dishwashing compartment and circulated by further actuation of the motor until the dishes, etc. in the dishwasher are heated and completely rinsed. The heated rinsing water is ultimately all discharged through the pipe 38, and the tea-wagon carrying the dishwasher, may then be set away for future use with the dishes, because of their heated condition, spontaneously drying.

The invention comprises both a tea wagon and a dishwashing machine, so closely associated as to constitute, in effect, a single machine, with the tea wagon provided with a top which may be of glass, serving as a tray and giving an ornamental appearance enhancing the effect of the entire structure. The combined tea-wagon and dishwasher may be used wherever suitable electric current is available and the top is so arranged that it may be removed, in order to obtain access to the dishwashing machine.

The strainer employed is advantageous because it saves washing, since it is only necessary, after the dishes have been washed, to remove and discard the strainer sheet, for the expense thereof is too trivial to be considered.

The dish-holding racks form convenient means for supporting the dishes when not in use, and may be left in the machine from one meal to another, and, moreover, are readily detachable by simply lifting them from clips 42 attached to the inner faces of the dishwashing tank.

The pump, the motor, the motor casing enclosing the motor, the spray mechanism 27, the draining mechanism, and the dishracks are associated into a self-contained unit, which may be removed intact from the dishwashing compartment, for cleansing and repairs, when such become necessary.

The electric motor 11 is provided with a lubricating system, comprising pipes 43, leading downwardly from the lower end of the counter bore or oil cup $12^a$ to the shaft bearings 44 at each end of the motor and also to the shaft $13^a$. The purpose of the lubricating system is to minimize friction where such is liable to occur and to prevent heating of the bearings.

By removing the cap $15^d$, the cup $12^a$ becomes very accessible and oil is readily distributed by gravitation to all the pipes 43 and finds ready access to all the points of the motor needing lubrication.

What is claimed is:—

1. In a machine of the character described, a body, a dishwashing tank carried by the body and provided with means for supporting the dishes, a motor-driven pump contained within the body, a pipe rising from the pump to circulate both wash and rinsing water in the tank, spraying means in the tank connected to the pipe rising from the pump, and a drain pipe rising above and connected to the spraying means and swiveled thereto to rise and fall within the tank, permitting the location of the discharge end of the last-named pipe over a sink.

2. In a machine of the character described, a body, a dishwashing tank carried by the body and provided with means for supporting the dishes, a motor-driven pump contained within the body, a pipe rising from the pump to circulate both wash and rinsing water in the tank, a spraying means in the tank connected to the pipe rising from the pump, and a drain pipe rising above and connected to the spraying means and swiveled thereto to rise and fall within the tank, permitting the location of the discharge end of the last-named pipe over a sink, said spraying means and the pipe to which it is connected including a valve whereby water may be circulated through the dishwasher to cleanse dishes lodged therein or to direct the water through the drain pipe to the sink.

3. In a dishwashing machine, a receptacle for soiled dishes, a pump located at a low point in the dishwashing machine, a motor for driving the pump, means connected to the pump for circulating wash water to the dishes, and discharge connections for the pump rising above the top of the dishwashing machine and connected to said means and adjustable both horizontally and vertically to discharge directly into a sink, or to be housed within the receptacle, whereby to eliminate the necessity of permanently connecting the machine to a sewer or emptying the wash water from a receptacle located low down with respect to the machine.

4. In a dishwashing machine, a swiveled pipe mounted in the machine and movable to a position overhanging a sink and to another position at a lower level than the first position so as to be housed within the machine, power-driven pump means connected to the interior of the dishwasher at a low point therein, pipe connections with the pump for discharging at a high point, and a valve operated by the movement of said swiveled pipe.

5. In a dishwashing machine, a pump within the machine, power means for driving the pump, a swiveled pipe having a discharge end movable to different elevations, and connected to the pump, water circulating means also connected to the pump, a valve for establishing communication between either the swiveled pipe or the water circulating means, and dish supporting means in the machine whereby, in one position of the swiveled pipe water in the machine is discharged therefrom and in another position of said pipe, the wash water is circulated through the dish-supporting means, to cleanse the dishes.

6. In a machine of the character described, a body, a dish-washing tank carried by the body and provided with means for supporting the dishes, a motor-driven pump contained within the body, a pipe rising from the pump to a high point in the tank, means connected to said pipe for delivering the water from the pump in the form of a spray onto the dishes, and a drain spout also connected to said pipe and rising above the tank so as to discharge the water into a sink, said pipe in its normal position being housed within the body and when raised above the body actuating a valve to shut off communication from the pump with the spray pipe and establish communication with the drain pipe.

7. In a dishwasher, the combination with a pump, a pipe extending from the pump, a distributing chamber into which said pipe delivers, a horizontal pipe communicating with the distributing chamber off center, said horizontal pipe being provided with a series of partitions or vanes which are acted upon by the water discharged from said chamber to cause the rotation of said pipe, and a perforated pipe communicating with the horizontal pipe and having its perforations arranged helically.

In testimony, that I claim the foregoing as my own, I have hereto affixed my signature.

CHARLES F. CHAPMAN.